Aug. 30, 1927.

E. V. POSTON 1,641,048

PROCESS OF VENEERING BRICK

Filed Sept. 7. 1926    2 Sheets-Sheet 1

Witnesses:

Emmett V. Poston
INVENTOR.

BY
C.B. McCall.
ATTORNEYS.

Aug. 30, 1927.

E. V. POSTON 1,641,048

PROCESS OF VENEERING BRICK

Filed Sept. 7, 1926  2 Sheets-Sheet 2

Witnesses:
Thomas N. Fulton
Zeta Marie Fulton

Emmett V. Poston
INVENTOR.

BY A.B. McCall.
ATTORNEYS.

Patented Aug. 30, 1927.

1,641,048

UNITED STATES PATENT OFFICE.

EMMETT V. POSTON, OF SPRINGFIELD, ILLINOIS.

PROCESS OF VENEERING BRICK.

Application filed September 7, 1926. Serial No. 133,899.

My invention relates to novel method for producing a veneered face brick and particularly improvements in methods of securing a beautiful, natural appearing veneer texture on the face of the brick that will give a neat and attractive appearance in light and shadow effects when in use.

One of the objects of this invention is to provide a process whereby facing brick may be economically manufactured in quantities with a veneer of suitable texture on the exposed brick surfaces.

A further object of my invention is to provide a method whereby a moistened granulated clay or other suitable granular particles may be forcibly blown into the surface of a plastic clay column as the column moves along out of the die causing the granular particles of clay and the like to become embedded in the surface of the clay column and form a veneer surface or veneered face therefor composed of granular particles of moistened clay and the like which are adapted to produce a beautiful, veneered texture for the brick.

A particular object of my invention is to provide a process whereby when veneering the face of the brick by blowing into the clay column quantities of granular particles of clay and the like, the resulting texture may be varied either by an optional variation in the flow of granular particles or by a variation in the force with which they are blown into the plastic clay column while said particles are moist.

I attain the objects of my invention described in the annexed specification, recited in the claims and illustrated in the accompanying drawings, in which like reference numerals indicate like parts in the several figures.

Referring to the figures.

Referring in detail to the drawings, I provide a hopper —1— adapted to receive for distribution suitable quantities of moistened granular particles —2— intended to be forcibly blown and embedded into the clay column —3— by a force of pressure such as high pressure steam or compressed air and the like applied through pipe —4—.

Figure 1:
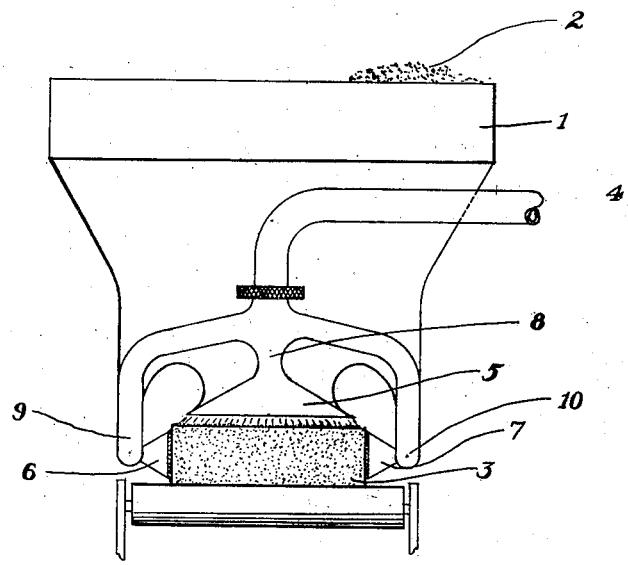
Figure 1 is an end view of the device of my invention adapted to be used in the process of my invention.
Figure 2:
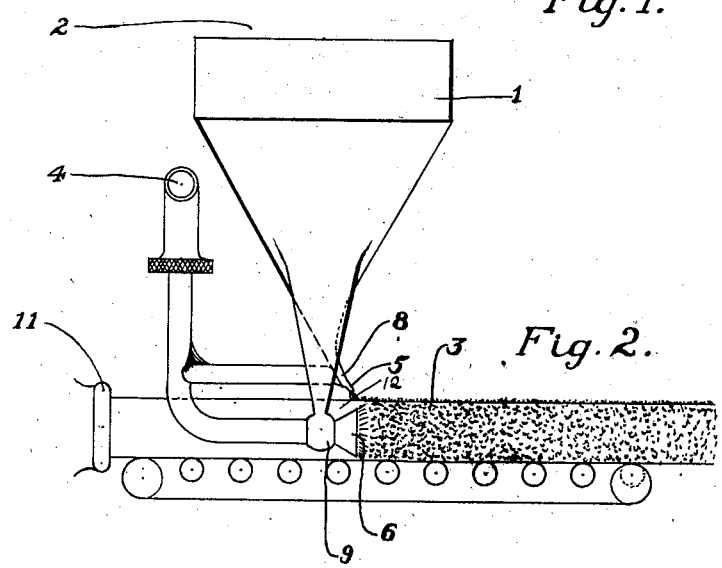
Figure 2 is a side elevation of the same.
Figure 3:
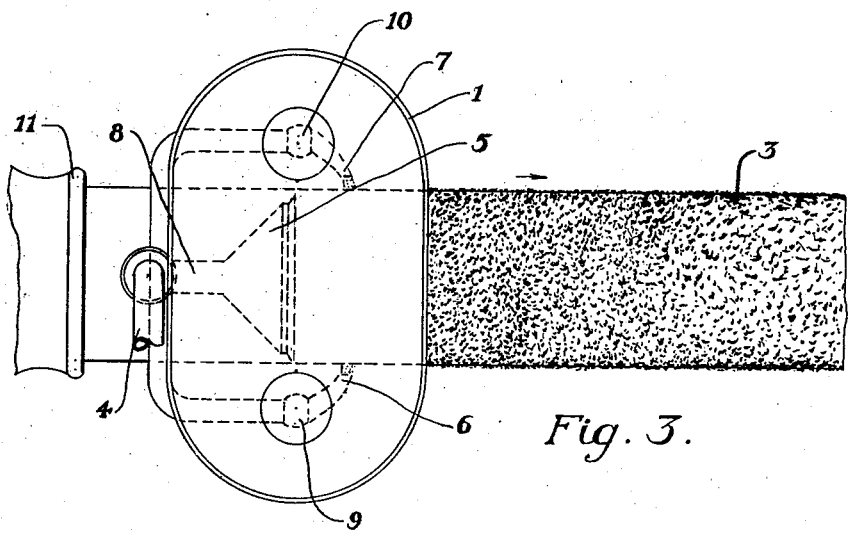
Figure 3 is a top view looking down on the clay column and the hopper.
Figure 4:
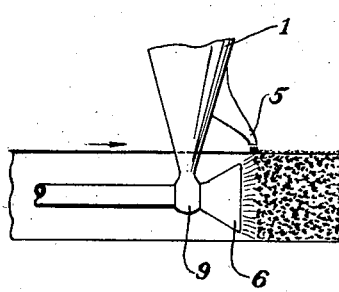
Figure 4 is a detail showing the manner in which the moistened granular clay particles are blown into the clay column.
Figure 5:
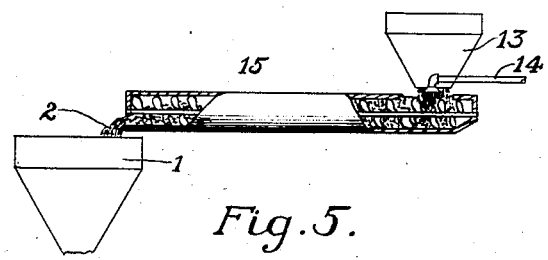
Figure 5 is a detail showing a means of mixing the clay particles after moistening the same in shape for the hopper the same to get them in shape for the hopper from which they are to be blown into the clay column.

By observing Figure 5 it will be seen that the granular particles of clay for instance, may be fed into the hopper —1— after being suitably moistened while coming from supply bin —13— by means of water running through pipe —14— where the moistened granular particles are thoroughly mixed in a mixing tube —15— from which they are carried to hopper —1—.

As the moistened granular particles of clay and the like leave hopper —1—, they are carried through nozzles —5—, —6— and —7— from the ends of which they are forcibly blown into and embedded in the plastic clay column —3—.

With nozzles —5—, —6— and —7— are respectively connected corresponding pressure nozzles —8—, —9— and —10— for carrying steam or compressed air to a point from which it blows the granular clay particles and the like into clay column —3—.

It will be seen that by forcing the moistened particles of clay and the like out of nozzles —5—, —6— and —7— by pressure coming from pipe —4— down through nozzles —8—, —9— and —10— that such moistened particles may be embedded into the clay column with a variable force into the top and two side surfaces thereof simultaneously so that when such particles strike the plastic column they are embedded into the surface thereof sufficiently deep and in sufficient quantities to produce a veneered surface that will be beautiful in appearance in light and shadow effects.

It will also be seen that the moistened clay particles may be fed into hopper —1— only as fast as they are fed out of it if it is desired in order to avoid congestion with too much clay in the hopper which might have a tendency to cause the clay to cake and not flow evenly depending somewhat on the amount of moisture and the characteristics of the veneer materials. It will be further seen that the characteristics of the veneer texture may be varied either by varying the size and shape of the moistened veneer particles blown into the clay column or by a variation in the steam or compressed air force with which such particles are blown into the clay column.

After suitably moistening the granular clay particles and the like and delivering the same to hopper —1— it will be observed that when in normal operation during the process of veneering brick that as plastic clay column —3— slowly moves out of die —11—, the surface of column —3— at point —12— is smooth but a smooth finish is not usually desired on face brick for the reason that it does not have a texture which produces a beautiful light and shadow effect on the face of the brick when the light of the sun shines on the brick while in normal use; so it is to produce the attractive variations in light and shadow and colors in the face brick that efforts are made to secure an attractive texture or veneer on face brick.

Clay column —3— moving forward out of die —11— passes by nozzles —5—, —6— and —7— where the column receives a forceful application of the moistened granulated clay —2— carried to the column from hopper —1— through a pressure of air or steam coming through nozzles —8—, —9— and —10— forcing with it a steady stream of moistened veneer particles and the like with a variable pressure which forcibly blows the moistened veneer particles into the plastic face of the clay column into which the moistened particles are embedded producing a veneer surface and texture on the face of the brick.

When the granular veneer particles and the like are suitably moistened before being blown into the face of the clay column they are thus easily embedded into the surface of the clay column and the depth to which they are embedded may be varied with the variation and pressure with which they are blown against the clay column and it will be seen that the coarseness of the veneered texture produced by this process may be varied with a variation in the size of the granular particles.

Figure 6:
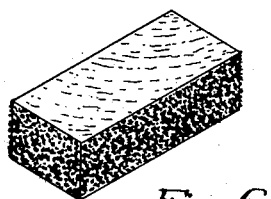
Figure 6 is a detail showing the appearance of a brick made under my process.

After the clay column has been thus veneered it moves on slowly to the cutting machine which cuts the column into a plurality of brick units such as is shown in Figure 6.

To those skilled in the art of manufacturing brick, it will be evident that the details of structure may be varied somewhat for convenience and economy of manufacture to suit the situation in which the device is adapted to operate and still not depart from the spirit and scope of my invention as long as this preferred process is adhered to.

Having thus disclosed the nature of my invention, what I claim is:

1. The process of ornamenting the plastic surface of a clay column consisting in forcibly projecting granular material into the plastic surface of the column by a fluid stream.

2. The method of ornamenting a plastic surface of a clay column in a plastic state comprising forcibly conducting to and imbedding ornamenting material in the surface by a fluid stream.

3. The method of ornamenting a plastic surface of a clay column in plastic state comprising forcibly conveying, imbedding and projecting ornamenting material in a plastic state against the surface in suspension in a fluid current.

4. The method of ornamenting a plastic surface of a clay column in plastic state consisting of forcibly conveying and projecting ornamenting material in a plastic state against the surface in suspension on a wet fluid current and utilizing the fluid current for reducing the ornamenting material to a plastic state.

5. The method of ornamenting the surface of a plastic clay column in plastic state comprising passing the clay stream through a fluid current and feeding in a plastic state surface ornamenting material to said fluid current, said fluid current conducting the ornamenting material into contact with the clay stream.

6. The method of ornamenting plastic surfaces of a clay column in a plastic state consisting of subjecting the surfaces to a fluid current having material therein in a plastic state, said fluid current conducting the ornamenting material onto the surfaces.

7. The method of ornamenting plastic surfaces of a clay column in a plastic state consisting of directing a fluid current against said surfaces, supplying said fluid current with ornamenting material in a plastic state and utilizing said fluid current for projecting the ornamenting material against the surfaces.

8. The method of ornamenting plastic surfaces of a clay column in a plastic state consisting of directing a fluid current against said surfaces, supplying said fluid current with ornamenting material in a plastic state and utilizing said fluid current for conducting the ornamenting material to the surfaces and forcibly imbedding the ornamenting material in the surfaces.

In witness whereof, I hereunto set my hand this 28th day of August A. D. 1926.

EMMETT V. POSTON.